US012772306B2

(12) United States Patent
Stationwala et al.

(10) Patent No.: US 12,772,306 B2
(45) Date of Patent: Oct. 20, 2026

(54) EXTENSION OF ISOCHRONOUS CHANNELS FOR REGULAR ASYNCHRONOUS CONNECTION LINK TRANSACTIONS

(71) Applicant: Silicon Laboratories Inc., Austin, TX (US)

(72) Inventors: Hasan Ali Stationwala, Hyderabad (IN); Ayan Ghosh, Hyderabad (IN); Srinivasa Reddy Konatham, Hyderabad (IN); Sandeep Voruganti, Hyderabad (IN); Raghu Ram Sista, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 583 days.

(21) Appl. No.: 18/103,674

(22) Filed: Jan. 31, 2023

(65) Prior Publication Data

US 2024/0260102 A1 Aug. 1, 2024

(51) Int. Cl.
*H04W 76/11* (2018.01)
*H04L 47/2408* (2022.01)
(Continued)

(52) U.S. Cl.
CPC ......... *H04W 76/11* (2018.02); *H04L 47/2408* (2013.01); *H04L 47/28* (2013.01);
(Continued)

(58) Field of Classification Search
None
See application file for complete search history.

(56) References Cited

U.S. PATENT DOCUMENTS 5,459,846 A 10/1995 Hyatt
6,032,211 A 2/2000 Hewitt
(Continued)

FOREIGN PATENT DOCUMENTS

WO 2024071871 A1 4/2024

OTHER PUBLICATIONS

Bluetooth®, "Architecture, Mixing, and Conventions," Specification of the Bluetooth® System, vol. 1, Revision v. 5.3, Revision Date Jul. 13, 2021, 202 pages.
(Continued)

*Primary Examiner* — Jutai Kao
(74) *Attorney, Agent, or Firm* — Zagorin Cave LLP

(57) ABSTRACT

An isochronous channel extension technique transmits asynchronous data using an isochronous channel to reduce or eliminate latency of asynchronous data transfers when asynchronous events and isochronous events with the same peer conflict. A method includes transmitting by a first device, a first data stream using a first channel and a second data stream using a second channel. The first channel has a first interval of first connection events and the second channel has a second interval of second connection events. The first connection events include a first conflicting connection event conflicting with a second conflicting connection event of the second connection events. A first packet of the first data stream associated with the first conflicting connection event is transmitted in the first conflicting connection event and a second packet of the second channel associated with the second conflicting connection event is transmitted in the first conflicting connection event.

14 Claims, 10 Drawing Sheets

(51) Int. Cl.
*H04L 47/28* (2022.01)
*H04W 56/00* (2009.01)
*H04W 74/00* (2009.01)
*H04W 76/16* (2018.01)

(52) U.S. Cl.
CPC ....... *H04W 56/001* (2013.01); *H04W 74/002* (2013.01); *H04W 76/16* (2018.02)

(56) References Cited

U.S. PATENT DOCUMENTS

| | | | | |
|---|---|---|---|---|
| 6,148,357 | A | 11/2000 | Gulick | |
| 6,338,243 | B1 | 1/2002 | Takaoka | |
| 6,973,067 | B1 | 12/2005 | Haartsen | |
| 7,953,118 | B2 | 5/2011 | Krantz | |
| 8,605,757 | B2 * | 12/2013 | Fourcand | H04L 47/28 370/535 |
| 11,006,324 | B2 | 5/2021 | Anreoli-Fang | |
| 11,240,586 | B1 | 2/2022 | Yan | |
| 12,250,654 | B2 | 3/2025 | Abreu | |
| 12,483,357 | B2 | 11/2025 | Stationwala et al. | |
| 12,632,213 | B2 | 5/2026 | Russell | |
| 2007/0242702 | A1 | 10/2007 | Shim | |
| 2009/0061767 | A1 | 3/2009 | Horiuchi | |
| 2009/0201827 | A1 | 8/2009 | Kwon | |
| 2010/0054243 | A1 | 3/2010 | Stone | |
| 2012/0151537 | A1 | 6/2012 | Singh | |
| 2012/0281704 | A1 | 11/2012 | Butterworth | |
| 2013/0021933 | A1 | 1/2013 | Kovvali | |
| 2019/0104079 | A1 | 4/2019 | Wang | |
| 2021/0160009 | A1 * | 5/2021 | Goyal | H04L 5/0055 |
| 2021/0235317 | A1 | 7/2021 | Hu | |
| 2021/0274047 | A1 | 9/2021 | Ide | |
| 2021/0337248 | A1 | 10/2021 | Huang | |
| 2022/0030505 | A1 | 1/2022 | Lee et al. | |
| 2022/0078623 | A1 | 3/2022 | Kondareddy | |
| 2022/0103242 | A1 | 3/2022 | Teranishi | |
| 2022/0116711 | A1 | 4/2022 | Haggai | |
| 2022/0159591 | A1 | 5/2022 | Sonobe | |
| 2022/0200716 | A1 | 6/2022 | Bonde | |
| 2022/0239419 | A1 | 7/2022 | Bai | |
| 2022/0400503 | A1 | 12/2022 | Cavalcanti | |
| 2023/0069016 | A1 | 3/2023 | Huang | |
| 2023/0100921 | A1 | 3/2023 | Cheong | |
| 2023/0106680 | A1 | 4/2023 | Lee | |
| 2023/0110357 | A1 | 4/2023 | Kämäräinen | |
| 2023/0126759 | A1 | 4/2023 | Lan | |
| 2023/0224078 | A1 | 7/2023 | Abildgren | |
| 2024/0056207 | A1 | 2/2024 | Xu | |
| 2024/0121550 | A1 | 4/2024 | Kumar | |
| 2024/0155711 | A1 | 5/2024 | Chuo | |
| 2024/0179235 | A1 | 5/2024 | Kalaimani | |
| 2024/0187137 | A1 | 6/2024 | Serikar | |
| 2024/0275525 | A1 | 8/2024 | Stationwala | |
| 2024/0276306 | A1 | 8/2024 | Rachamadugu et al. | |
| 2024/0276537 | A1 | 8/2024 | Rachamadugu et al. | |
| 2024/0334362 | A1 | 10/2024 | Stationwala et al. | |
| 2024/0396849 | A1 | 11/2024 | Lee | |
| 2025/0048460 | A1 * | 2/2025 | Lee | H04L 69/22 |

OTHER PUBLICATIONS

Bluetooth®, "Low Energy Controller," Specification of the Bluetooth® System, vol. 6, Revision v. 5.3, Revision Date Jul. 13, 2021, 422 pages.

Bluetooth Generic Audio Working Group, "Basic Audio Profile," Bluetooth® Profile Specification, Revision v1.0.1, Revision Date Jun. 21, 2022, 148 pages.

Silicon Labs, "UG434: Silicon Labs Bluetooth® C Application Developer's Guide for SDK v3.x and Higher," Revision 1.0, downloaded from silabs.com on Sep. 13, 2022, 35 pages.

Silicon Labs, "UG103.14: Bluetooth® LE Fundamentals," Revision 0.7, downloaded from silabs.com on Sep. 13, 2022, 21 pages.

Townsend, K., "Introduction to Bluetooth Low Energy," downloaded from https://learn.adafruit.com/introduction-to-bluetooth-low-energy, Feb. 14, 2022, 10 pages.

Woolley, M., "The Bluetooth® Low Energy Primer," Version 1.0.4, Jun. 6, 2022, 87 pages.

Woolley, M., "Bluetooth Core Specification Version 5.2 Feature Overview," Version 1.0.1, Dec. 9, 2020, 37 pages.

Bluetooth®, "Bluetooth Core Specification," Version: v5.4, Jan. 31, 2023, by Core Specification Working Group, vol. 1, Part A, §§ 3.4 and 3.5, 20 pages.

Bluetooth®, "Bluetooth Core Specification," Version: v5.4, Jan. 31, 2023, by Core Specification Working Group, vol. 6, Part B, §§ 4.4 and 4.5, 89 pages.

Hunn, N., "Introducing Bluetooth®, LE Audio," published Jan. 2022, downloaded from www.bleaudio.com on Nov. 21, 2022, 315 pages.

* cited by examiner

EXTENSION OF ISOCHRONOUS CHANNELS FOR REGULAR ASYNCHRONOUS CONNECTION LINK TRANSACTIONS

BACKGROUND

Field of the Invention

This disclosure relates to communications devices and more particularly to short range wireless devices.

Description of the Related Art

Bluetooth™ Low Energy (BLE) is an exemplary communications protocol designed for low power and low latency applications. In general, the BLE protocol (i.e., the protocol described in Bluetooth Core Specification Version 5.2 or later) supports isochronous data transactions (e.g., a Connected Isochronous Stream (CIS)) and asynchronous data transactions (e.g., Asynchronous Connection Link (ACL) transactions). An upper layer of the Bluetooth protocol stack uses isochronous data transactions for constant data throughput and periodicity. Isochronous data transactions may be used for latency-sensitive data, i.e., time-bound data for time-synchronized processing (e.g., real time voice or audio streaming). The data has a time-limited validity period, at the end of which it is said to expire. Expired data that has not yet been transmitted is discarded. Receiving devices only receive data that is valid with respect to rules regarding its age and acceptable latency. Isochronous data transactions ensure that multiple receiving devices receiving data from the same transmitting device, will render it at the same time.

Asynchronous data transactions are typically used for communication of general data packets using a Bluetooth connection. An upper layer of the Bluetooth protocol stack does not generate asynchronous data at a fixed periodicity. Data exchange on a physical channel occurs at synchronized intervals referred to as asynchronous connection events, which occur at a gap of an asynchronous connection interval. Currently, the BLE protocol allows for upper layer user data to be transmitted over the isochronous channel. However, the isochronous data channel cannot carry regular asynchronous data since the protocol for asynchronous data communication is inconsistent with the protocol for isochronous data communication.

A True Wireless Stereo (TWS), an exemplary application of Bluetooth communications (e.g., earphones), likely consumes approximately 20-50% of the bandwidth at a periodicity of as low as 7.5-10 ms depending upon Quality of Service (QoS) configuration and a selected physical interface bitrate used. Isochronous subevents of TWS applications have a high probability of clashing with asynchronous data events with the same peer or other peers, thereby substantially delaying control messages and complicating scheduler designs. A strict coupling of isochronous data packets with isochronous connection events and asynchronous data packets with asynchronous connection events can be an inefficient use of the wireless communications channel. Accordingly, improved techniques for communicating isochronous and asynchronous data are desired.

SUMMARY OF EMBODIMENTS OF THE INVENTION

In at least one embodiment, a method for communicating between devices using a wireless communications interface includes transmitting by a first device, a first data stream using a first channel and a second data stream using a second channel. The first channel has a first interval of first connection events and the second channel has a second interval of second connection events. The first connection events include a first conflicting connection event conflicting with a second conflicting connection event of the second connection events. A first packet of the first data stream associated with the first conflicting connection event is transmitted in the first conflicting connection event and a second packet of the second channel associated with the second conflicting connection event is transmitted in the first conflicting connection event.

In at least one embodiment, a wireless communications system includes a first device configured to transmit a first data stream using a first channel and a second data stream using a second channel. The first channel has a first interval of first connection events and the second channel has a second interval of second connection events. The first connection events include a first conflicting connection event conflicting with a second conflicting connection event of the second connection events. A first packet of the first data stream associated with the first conflicting connection event is transmitted in the first conflicting connection event and a second packet of the second channel associated with the second conflicting connection event is transmitted in the first conflicting connection event.

A method for communicating between devices using a wireless communications interface includes receiving by a first device, a first data stream using a first channel and a second data stream using a second channel. The first channel has a first interval of first connection events and the second channel has a second interval of second connection events. A first packet of the first data stream associated with the first conflicting connection event is received in the first conflicting connection event and a second packet of the second channel associated with the second conflicting connection event is received in the first conflicting connection event.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

An isochronous channel extension technique handles scheduling conflicts between asynchronous data events and isochronous data events with the same peer device, thereby substantially reducing the latency for asynchronous data transfers in the presence of an isochronous channel and substantially reducing scheduler complexity. The isochronous data channel extension technique transmits asynchronous data (e.g., data physical channel Protocol Data Units (PDUs)) using a subevent of an isochronous connection event of an isochronous channel to reduce or eliminate latency of asynchronous data transfers.

Figure 1:
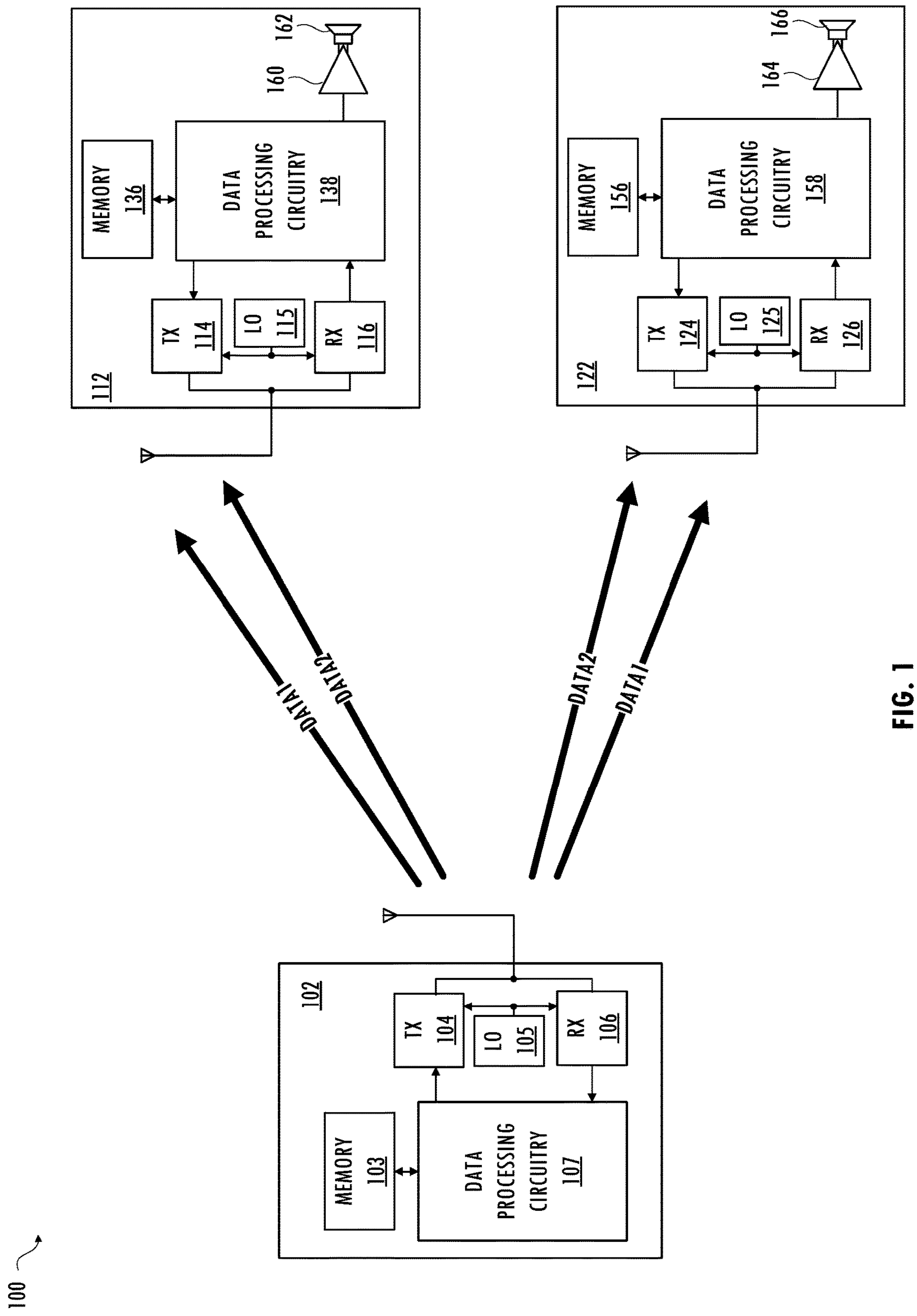
FIG. 1 illustrates a functional block diagram of an exemplary wireless communications system.

Referring to FIG. 1 in at least one embodiment, a wireless communications system includes wireless communications device 102, wireless communications device 112, and wireless communications device 122 which are devices compliant with the BLE standardized communications protocol. Wireless communications device 102 includes transmitter 104, receiver 106, data processing circuitry 107, memory 103, and local oscillator 105. Wireless communications device 112 includes transmitter 114, receiver 116, data processing circuitry 138, memory 136, and local oscillator 115. Wireless communications device 122 includes transmitter 124, receiver 126, data processing circuitry 158, memory 156, and local oscillator 125. Wireless communications system 100 is compliant with the Bluetooth Core Specification Version 5.2 or later. Local oscillator 105, local oscillator 115, and local oscillator 125 provide signals used in transceiver functions of wireless communications device 102, wireless communications device 112, and wireless communications device 122, respectively.

In at least one embodiment, transmitter 114, receiver 116, local oscillator 115, data processing circuitry 138, and memory 136 are included in a controller implementing a physical layer (RF and PHY), which controls radio frequency communications, and a link layer of a BLE device. In an embodiment of wireless communications system 100, wireless communications device 112 and wireless communications device 122 are BLE audio devices (e.g., earbuds) and data processing circuitry 138 and data processing circuitry 158 provide signals to driver 160 and driver 164, respectively, which drive transducer 162 and transducer 166, respectively, to generate audio signals. In some embodiments, wireless communications device 112 and wireless communications device 122 are hearing aid devices and include at least one microphone (not shown), telecoil, or sensor coupled to data processing circuitry 138 or data processing circuitry 158.

Figure 2A:
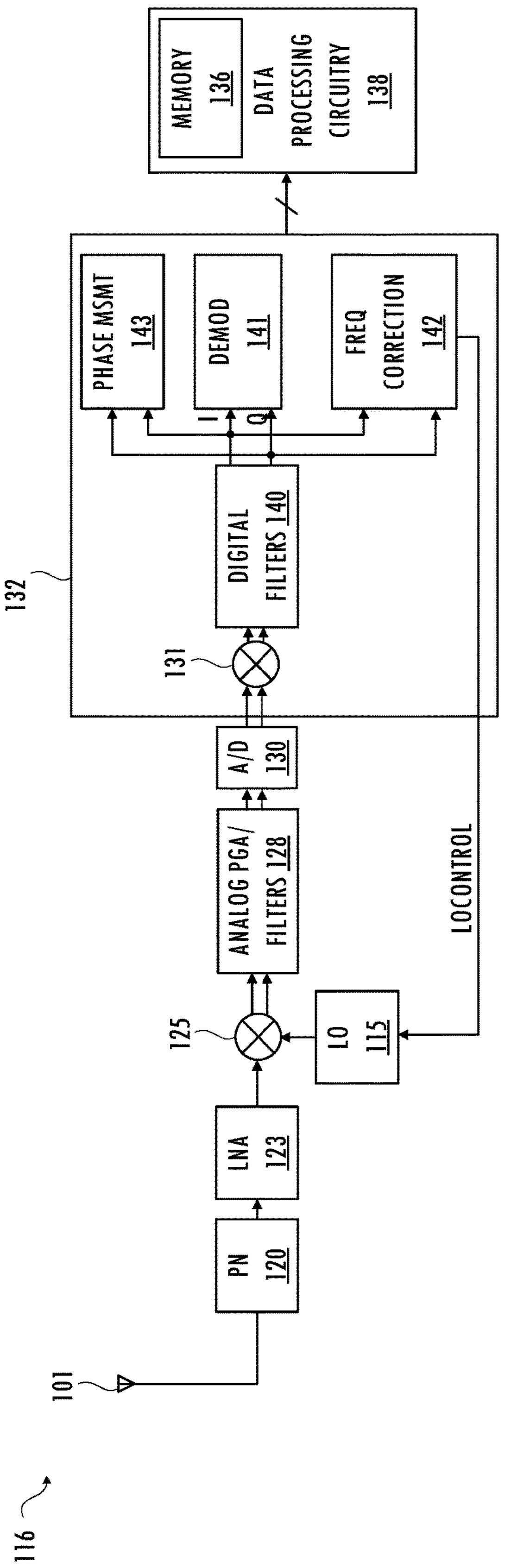
FIG. 2A illustrates a functional block diagram of an exemplary receiver portion of the wireless communications system of FIG. 1.

FIG. 2A illustrates an exemplary embodiment of a receiver that may be included in wireless communications device 102, wireless communications device 112, or wireless communications device 122. Antenna 101 provides an RF signal to passive network 120, which provides impedance matching, filtering, and electrostatic discharge protection. Passive network 120 is coupled to low-noise amplifier (LNA) 123, which amplifies the RF signal without substantial degradation to the signal-to-noise ratio and provides the amplified RF signal to frequency mixer 125. Frequency mixer 125 performs frequency translation or shifting of the RF signal using a reference or local oscillator (LO) signal provided by local oscillator 115. For example, in at least one operational mode of receiver 116, frequency mixer 125 translates the RF signal frequencies from a 2.4 GHz frequency band to baseband frequencies centered at DC (i.e., zero-intermediate frequency (ZIF) in a ZIF mode of operation). In another operational mode, receiver 116 is configured as a low-intermediate frequency (LIF) receiver (i.e., in a LIF mode of operation) and frequency mixer 125 translates the RF signal to a low-intermediate frequency (e.g., 100-200 kHz) to avoid DC offset and 1/f noise problems of ZIF receivers.

Frequency mixer 125 provides the translated output signal as a set of two signals, an in-phase (I) signal, and a quadrature (Q) signal. The I and Q signals are analog time-domain signals. In at least one embodiment of receiver 116, the analog amplifiers and filters 128 provide amplified and filtered versions of the I and Q signals to analog-to-digital converter (ADC) 130, which converts those versions of the I and Q signals to digital I and Q signals (i.e., I and Q samples). Exemplary embodiments of ADC 130 use a variety of signal conversion techniques (e.g., delta-sigma (i.e., sigma-delta) analog to digital conversion). ADC 130 provides the digital I and Q signals to signal processing circuitry 132. In general, signal processing circuitry 132 performs processing (e.g., demodulation, frequency translation (e.g., using mixer 131), filtering (e.g., digital filters 140), or signal correction) of the digital I and Q signals. In at least one embodiment, signal processing circuitry 132 includes demodulator 141, which retrieves or extracts information from digital I and Q signals (e.g., data signals, that were modulated by a transmitter (not shown) and provided to antenna 101 as RF signals). In at least one embodiment, one or more circuits of signal processing circuitry 132 converts digital I and Q signals from a Cartesian representation into polar representation (i.e., instantaneous phase and instantaneous amplitude) for use by frequency correction circuit 142 or phase measurement circuit 143.

Data processing circuitry 138 may perform a variety of functions (e.g., logic, arithmetic, etc.). For example, data processing circuitry 138 may use the demodulated data in a program, routine, or algorithm (whether in software, firmware, hardware, or a combination thereof) to perform desired control or data processing tasks. In at least one embodiment, data processing circuitry 138, which includes memory 136, controls other circuitry, sub-system, or systems (not shown). In an embodiment, data processing circuitry 138 implements a BLE link layer that includes a state machine, defines state transitions, defines packet formats, performs scheduling, performs radio control, and provides link-layer decryption consistent with the BLE protocol.

Figure 2B:
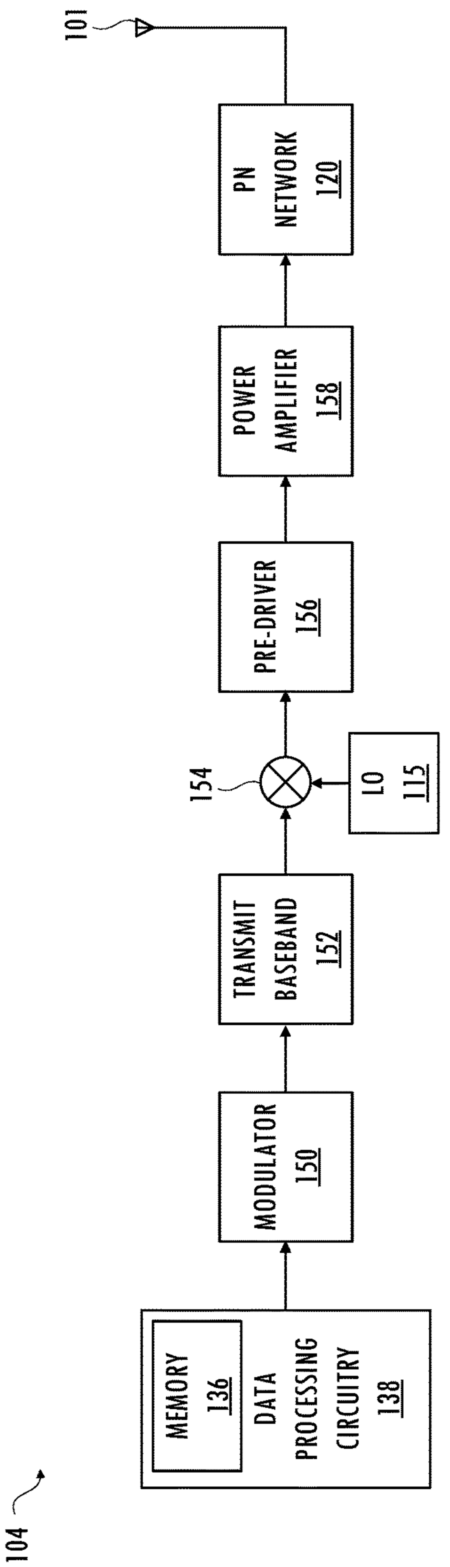
FIG. 2B illustrates a functional block diagram of an exemplary transmitter portion of the wireless communications system of FIG. 1.

FIG. 2B illustrates an exemplary embodiment of a transmitter that may be included in wireless communications device 102, wireless communications device 112, or wireless communications device 122 of FIG. 1. Data processing circuitry 138 may perform a variety of functions (e.g., logic, arithmetic, etc.). For example, data processing circuitry 138 executes a program, routine, or algorithm (whether in software, firmware, hardware, or a combination thereof) that performs desired control or data processing tasks consistent with the BLE physical layer and provides data to modulator 150. In an embodiment, modulator 150 implements Gaussian Frequency Shift Keying (GFSK) modulation. Modulator 150 provides the modulated data to transmit baseband circuit 152, which in an embodiment includes a digital-to-analog converter and analog programmable gain filters. Transmit baseband circuit 152 provides the baseband (or intermediate frequency (IF)) signal to mixer 154, which performs frequency translation or shifting of the baseband signal using a reference or local oscillator (LO) signal provided by local oscillator 115. In at least one operational mode of receiver 116, frequency mixer 154 translates the baseband signal centered at DC to a 2.4 GHz frequency band. Pre-driver 156 amplifies the signal generated by frequency mixer 154 to a level sufficient for power amplifier 158. Power amplifier 158 further amplifies the signal to provide a higher power signal sufficient to drive passive network 120 and antenna 101. Passive network 120 provides impedance matching, filtering, and electrostatic discharge protection.

Figure 3A:
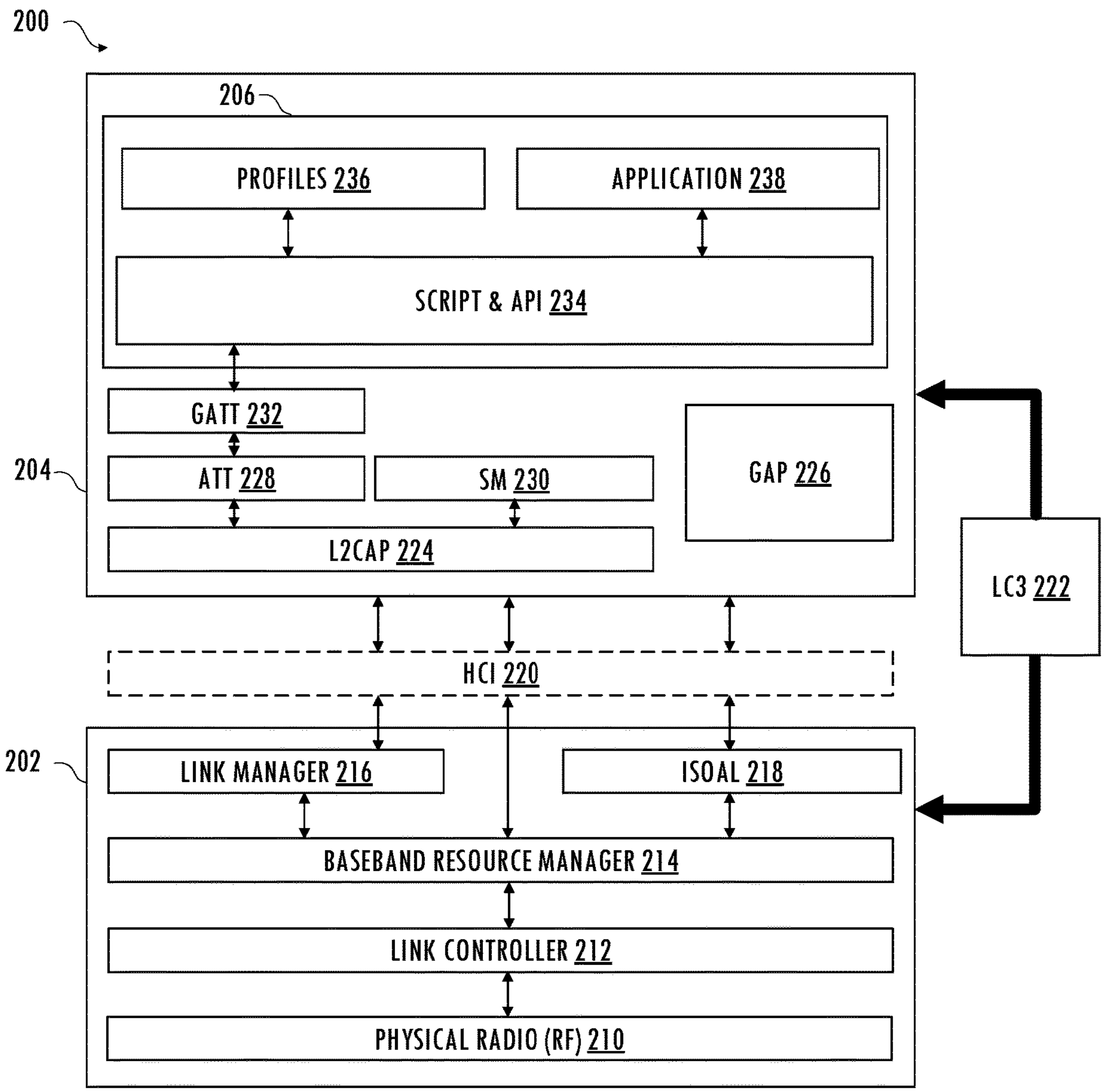
FIG. 3A illustrates a functional block diagram of portions of an exemplary communications device configured for BLE communications.

Referring to FIG. 3A, each wireless communications device of a BLE communications system implements the BLE architecture, e.g., implemented using separate integrated circuit devices for controller 202 and host 204. In some embodiments, wireless communications device 200 incorporates functionality of controller 202 and host 204 in a single integrated circuit device. Controller 202 includes physical radio (RF) 210 and link controller 212, which are responsible for sending packets over the air by defining the use of a radio, including modulation schemes, frequency bands, channel use, and transmitter and receiver characteristics, e.g., as described in Bluetooth Core Specification Version 5.3, Vol. 6: Low Energy Controller. Physical radio (RF) 210 transmits and receives packets of information on the physical channel and transforms a stream of data to and from the physical channel and the baseband into required formats. The physical layer defines the use of a radio (e.g., the transmitter and receiver described above), including modulation schemes, frequency bands, channel use, and transmitter and receiver characteristics. Link controller 212 implements the link layer protocol, which defines the air interface packet formats, bit stream processing procedures, a state machine and protocols of over-the-air communication, and link control. Link controller 212 encodes and decodes packets from a data payload and parameters related to a physical channel, logical transport, and logical link.

Baseband resource manager 214 negotiates access contracts, i.e., commitments to deliver a predetermined QoS that is required by a user application to provide expected performance. Baseband resource manager 214 also includes a scheduler that grants time on physical channels to entities that have negotiated an access contract. Isochronous Adaptation Layer (ISOAL) 218 converts between upper layer data units and lower layer data units, e.g., using fragmentation and recombination or segmentation and reassembly operations. ISOAL allows the size of isochronous data packets as created and consumed by upper layers of the architecture to be different from the size of data packets used by the link layer. In addition, ISOAL allows an upper layer to use timing intervals that differ from those used by the link layer so that the rate of Service Data Units (SDUs) exchanged with the upper layers is not the same as the rate with which they are exchanged with the link layer. Link manager 216 creates, modifies, and releases logical links (and associated logical transports, if required) and updates parameters related to physical links between devices. In an embodiment, wireless communications device 112 implements Host-to-Controller Interface (HCI) 220, which is a standard service interface.

In an embodiment, host 204 includes Generic Audio Framework (GAF) 206, Logical Link Control and Adaptation Protocol (L2CAP) resource manager 224, Attribute Protocol (ATT) 228, Generic Attribute Protocol (GATT) 232, Generic Access Profile (GAP) 226, and Security Manager (SM) 230. L2CAP resource manager 224 manages ordering of submission of PDU fragments and some relative scheduling between channels to ensure that L2CAP channels with QoS commitments are not denied access to the physical channel due to controller resource exhaustion. L2CAP resource manager 224 polices traffic to ensure that applications submit L2CAP SDUs within bounds of negotiated QoS settings. In an exemplary wireless communications device 112, GATT 232 defines the way that two BLE devices communicate data using services and characteristics. In an embodiment, GATT 232 uses a generic data protocol called the ATTribute protocol (ATT) 228, which is used to store services, characteristics and related data in a simple lookup table using 16-bit identifiers for each entry in the table. SM 230 implements a peer-to-peer protocol for generating encryption keys and identity keys and generates random addresses and resolves random addresses to known device identities. SM 230 provides stored keys to controller 202 for encryption and authentication during encryption or pairing procedures. GAP 226 represents base functionality common to all Bluetooth devices, e.g., modes and access procedures used by transports, protocols, and application profiles. GAP services include device discovery, connection modes, security authentication, associate models and service discovery. Generic Audio Framework (GAF) 206 includes Script and API 234, application 238, and profiles 236, which adds application specific information to GAF 206. For example, profiles 236 includes hearing access profile (HAP) and hearing access service (HAS), which provide applications for a hearing aid ecosystem, profiles 236 includes telephony and media audio profile (TMAP), which specifies higher quality codec settings and more complex media and telephony control, and profiles 236 includes public broadcast profile (PBP), which facilitates selecting globally interoperable broadcast systems.

Low complexity communications codec (LC3) 222 includes a codec for high performance telephony speech, wideband and super-wideband speech, and high-quality audio. LC3 222 encodes audio data into different channel streams (e.g., stereo is encoded as separate left and right streams). LC3 222 provides audio data as SDUs to the link layer, which generates PDUs for isochronous data streams. The link layer provides SDUs based on received PDUs to LC3 222 for decoding.

Figure 3B:
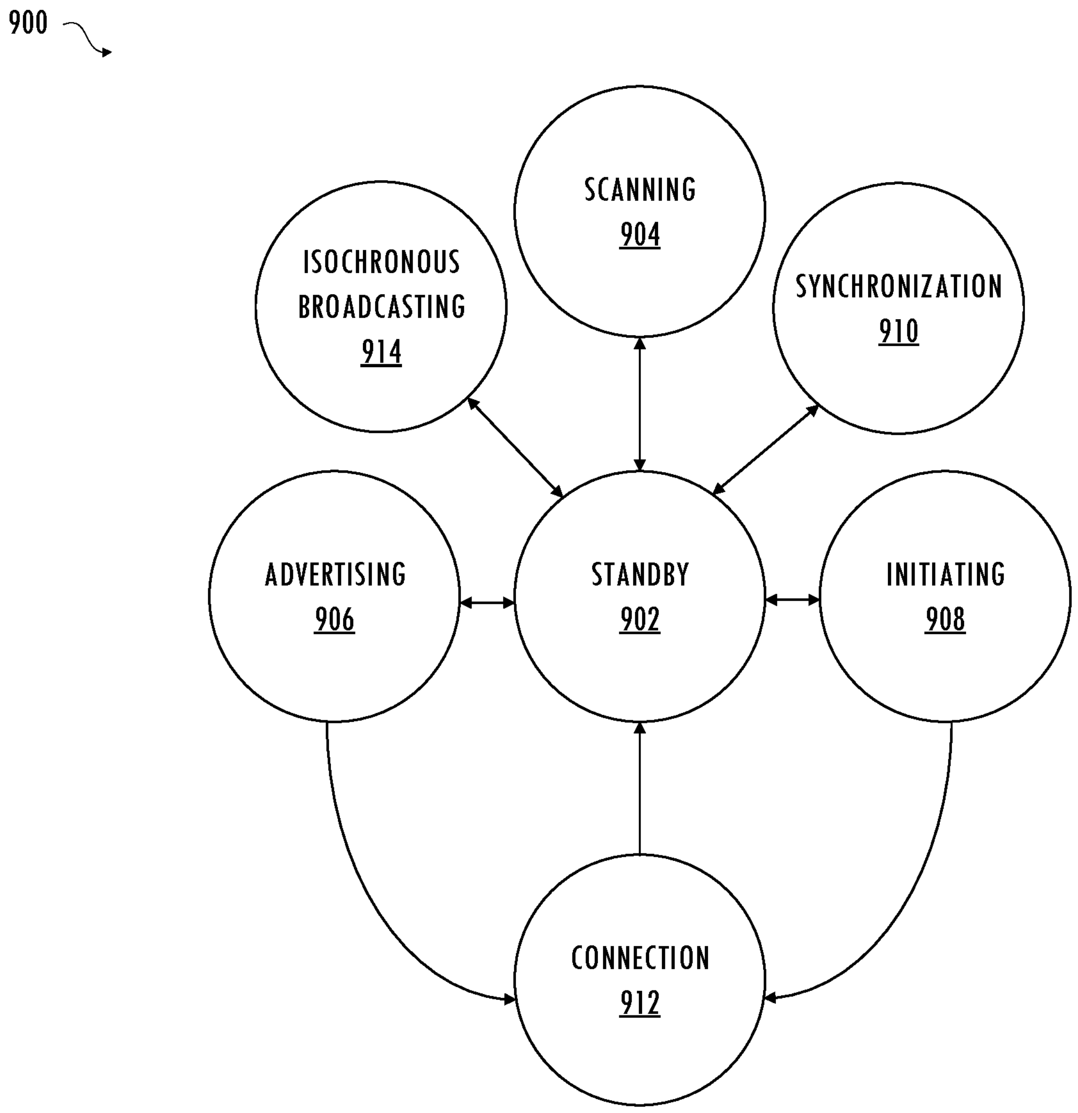
FIG. 3B illustrates an exemplary state diagram of the link layer implemented by link controller 212 of FIG. 3A.

FIG. 3B illustrates an exemplary link layer state machine 900 including standby state 902, scanning state 904 or advertising state 906, initiating state 908, synchronization state 910, connection state 912, and isochronous broadcasting state 914. Only one state of a link layer is active at a time. Link layer state machine 900 can enter standby state 902 from any other state. In standby state 902, the link layer does not transmit any packets. Link layer state machine 900 may enter advertising state 906 from standby state 902. In advertising state 906, the link layer transmits advertising physical channel packets and may listen to and respond to a response triggered by the advertising physical channel packets. Link layer state machine 900 may enter scanning state 904 from standby state 902. In scanning state 904, the link layer listens for advertising physical channel packets from devices that are advertising. Link layer state machine 900 may enter initiating state 908 from standby state 902. In initiating state 908, the link layer listens for advertising physical channel packets from a specific device and responds to these packets to initiate a connection with another device. Link layer state machine 900 may enter synchronization state 910 from standby state 902. In synchronization state 910, the link layer listens for periodic channel packets forming a specific periodic advertising train transmitted by a specified device (e.g., a host may direct the link layer to listen for isochronous data packets coming from a specified device that is transmitting a broadcast isochronous group (BIG)). Link layer state machine 900 may enter isochronous broadcasting state 914 from standby state 902. In isochronous broadcasting state 914, the link layer transmits isochronous data packets on an isochronous physical channel.

Link layer state machine 900 may enter connection state 912 from initiating state 908 or advertising state 906. When entering connection state 912 from initiating state 908, the connection state is the central role (i.e., the device is configured as a central device) and the link layer communicates with another device having a connection state of a peripheral role (i.e., the other device is configured as a peripheral device) and defines the timings of transmissions. When entering connection state 912 from advertising state 906, the connection state is the peripheral role and the link layer communicates with a single other device configured in the central role. In some embodiments, during connection state 912, the link layer transmits data physical channel PDUs in connection events. A connection event typically contains at least one packet sent by the central device. The same data channel index is used for all packets in a connection event. In some embodiments, during a connection event, the central device and peripheral device alternate sending and receiving packets.

In an embodiment, the link layer uses one physical channel (RF channel) at a time. Each transmission on a physical channel is associated with a corresponding access address. In general, two devices use a shared physical channel to communicate with each other. Whenever the link layer of a device is synchronized to the timing, frequency, and access address of a physical channel, the link layer is connected on the data physical channel or synchronized to a periodic physical channel or an isochronous physical channel regardless of whether it is actively involved in communications over the channel. The link layer generates a new access address for each CIS it creates. Connections are exclusive, i.e., a peripheral device can be connected to only one central device at a time. As soon as a peripheral device connects to a central device, it stops advertising itself and other devices are no longer able to see it or connect to it until an existing connection is broken.

Figure 3C:
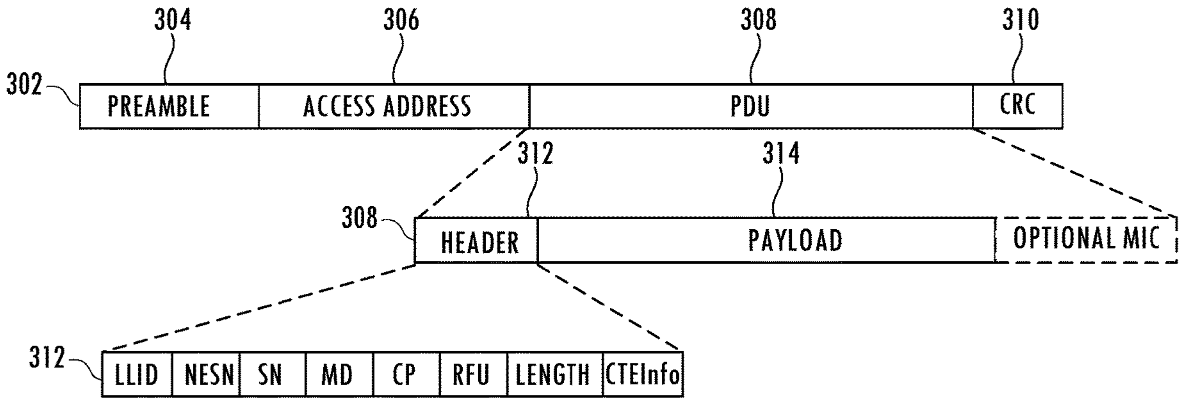
FIG. 3C illustrates a format of an Asynchronous Connection Link (ACL) packet.

FIG. 3C illustrates an exemplary BLE ACL radio packet for transmitting data by a wireless communications device. Packet 302 includes preamble 304 (e.g., 1 or 2 octets), access address 306 (e.g., 4 octets), PDU 308 (e.g., 2-257 octets) and cyclic redundancy check (CRC) 310 (e.g., 3 octets). PDU 308 includes header 312 (e.g., 16 bits), payload 314 (e.g., 0-251 octets), and an optional Message Integrity Check (e.g., 32 bits). Header 312 includes seven or eight fields: LLID indicates the type of content of the payload field of the PDU, e.g., whether the packet is a link layer data PDU or a link layer control PDU (e.g., 2 bits), Next Expected Sequence Number (e.g., 1 bit), Sequence Number (1 bit), More Data (e.g., 1 bit), CTEInfo Present (e.g., 1 bit), Reserved for Future Use bits (e.g., 2 bits), Length (e.g., 8 bits), and CTEInfo indicating a type and length of a Constant Tone Extension (if present, e.g., 8 bits).

Figure 3D:
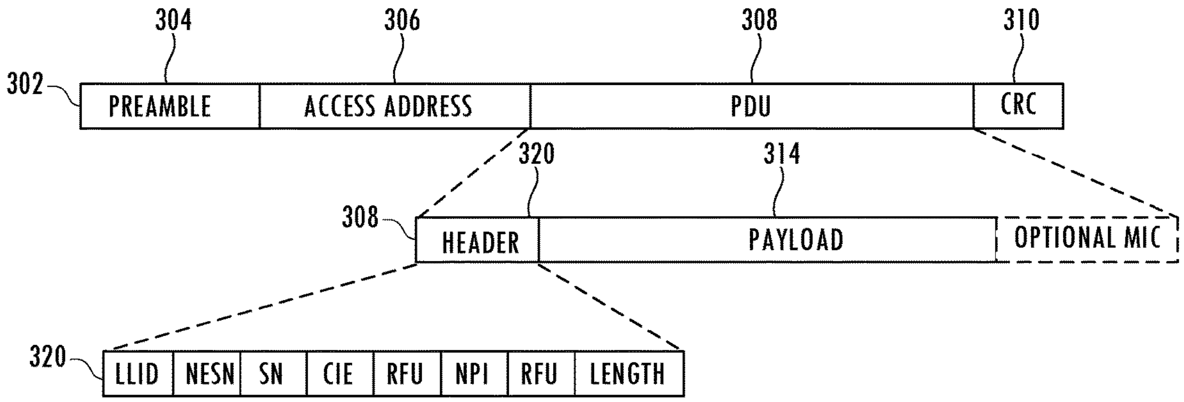
FIG. 3D illustrates a format of a Connected Isochronous Stream (CIS) packet.

FIG. 3D illustrates an exemplary BLE CIS radio packet for transmitting data by a wireless communications device. CIS packet 302 includes preamble 304 (e.g., 1 or 2 octets), access address 306 (e.g., 4 octets), PDU 308 (e.g., 2-257 octets) and cyclic redundancy check (CRC) 310 (e.g., 3 octets). PDU 308 includes header 320 (e.g., 16 bits), payload 314 (e.g., 0-251 octets), and an optional Message Integrity Check (e.g., 32 bits). Header 320 includes Link Layer ID (2 bits), Next Expected Sequence Number (e.g., 1 bit), Sequence Number (1 bit), Close Isochronous Event bit (e.g., 1 bit), Reserved for Future Use bits (e.g., 2 non-contiguous bits), Null Payload Indicator (e.g., 1 bit), and Length (e.g., 8 bits). Three of the four possible states (e.g., 0b00, 0b01, and 0b10) of two Link Layer ID bits indicate the type of content of the payload field of the PDU, e.g., whether the packet is a link layer data PDU or a link layer control PDU. A fourth state of the LLID bits (e.g., 0b11) is reserved for future use. The CIE bit indicates whether a source device has received an acknowledgment from the sink device confirming that the packet was successfully received by the sink device so that the source device will stop further retransmissions of that PDU. An early CIE bit allows the sink device to go to sleep until the next Isochronous Interval, allowing the source device to perform other tasks. In an embodiment, in response to the CIE bit being set, the sink device saves power by turning off its receiver until the next isochronous interval. The NPI bit indicates whether the packet is a CIS data PDU or a CIS null PDU (i.e., indicates whether data is being transmitted in the packet).

Referring back to FIG. 1, in an embodiment of wireless communications system 100, wireless communications device 102 is configured as a central device, which sets up schedules, manages isochronous streams, and sends commands. Wireless communications device 112 and wireless communications device 122 are configured as peripheral devices, which participate in streams and respond to commands. In an embodiment, wireless communications device 112 and wireless communications device 122 are small, wearable devices that communicate with wireless communications device 102 when they come within a predetermined distance from wireless communications device 102. In an embodiment, wireless communications device 102 is a smartphone that sends multiple, independent, synchronized audio streams to wireless communications device 112 and wireless communications device 122 (e.g., smart speakers, headphones, or earbuds). In other embodiments, wireless communications device 112 and wireless communications device 122 are wireless speakers that are configured as different channels (e.g., front left channel, back left channel, front right channel, or back right channel).

In an embodiment, wireless communications device 102 is configured as a BLE central device and wireless communications device 112 and wireless communications device 122 are configured as BLE peripheral devices. In general, a connection event between BLE devices starts when a central device sends a packet to a peripheral device at a predetermined connection interval. A central device controls initiating and managing multiple connections with one or more peripheral device. The peripheral device can respond in a predetermined amount of time (e.g., 150 μs) after it has received a packet from the central device. If the peripheral has no data to send, the peripheral can skip a certain number of connection events defined by a peripheral latency parameter. If the central or peripheral device does not receive any packets within a time defined by a supervision timeout, the corresponding device terminates the connection. In general, a connection event refers to a time within a timing-event reserved for sending or receiving packets. Isochronous data exchange using a physical channel occurs at synchronized intervals referred to as isochronous connection events, which occur at a gap in an isochronous connection interval. Services break data up into logical entities and contain specific chunks of data called characteristics. Each service has a unique user ID (UUID). Characteristics can be read from the peripheral or written to send data back to the peripheral. For example, a CIS reserves transmission and reception periods known as subevents on an isochronous physical channel and can be configured to retransmit packets in subevents of a current or subsequent event. Each CIS event starts at a moment called the CIS anchor point (e.g., based on a clock of a central device) and ends when closed. The CIS anchor points are regularly spaced apart by an isochronous interval. A first subevent of a CIS event starts at the CIS anchor point. Consecutive CIS subevents start a subinterval apart. Each CIS is part of a Connected Isochronous Group (CIG) of one or more CISs having a common timing reference based on a clock of a central device. In at least one embodiment, the connection interval is 7.5 ms-4000 ms, connection latency is 0-500 connection intervals, and the supervision timeout is 100 ms-3200 ms. However, in other embodiments, different timing intervals are used.

Figure 4A:
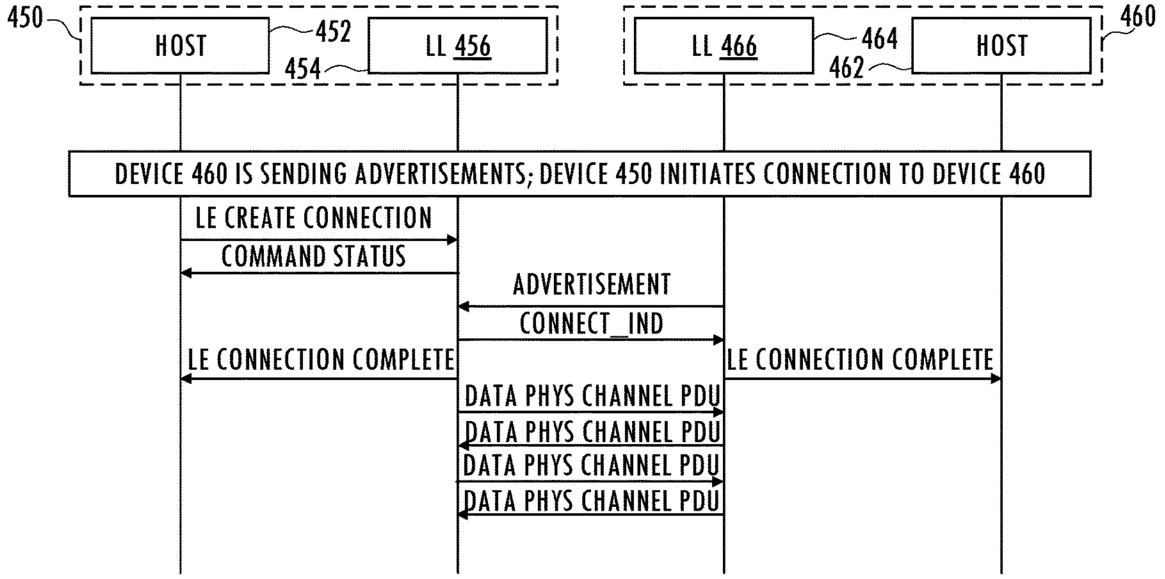
FIG. 4A illustrates an exemplary timing diagram for initiating a connection between two devices in a conventional BLE communications system.
Figure 4B:
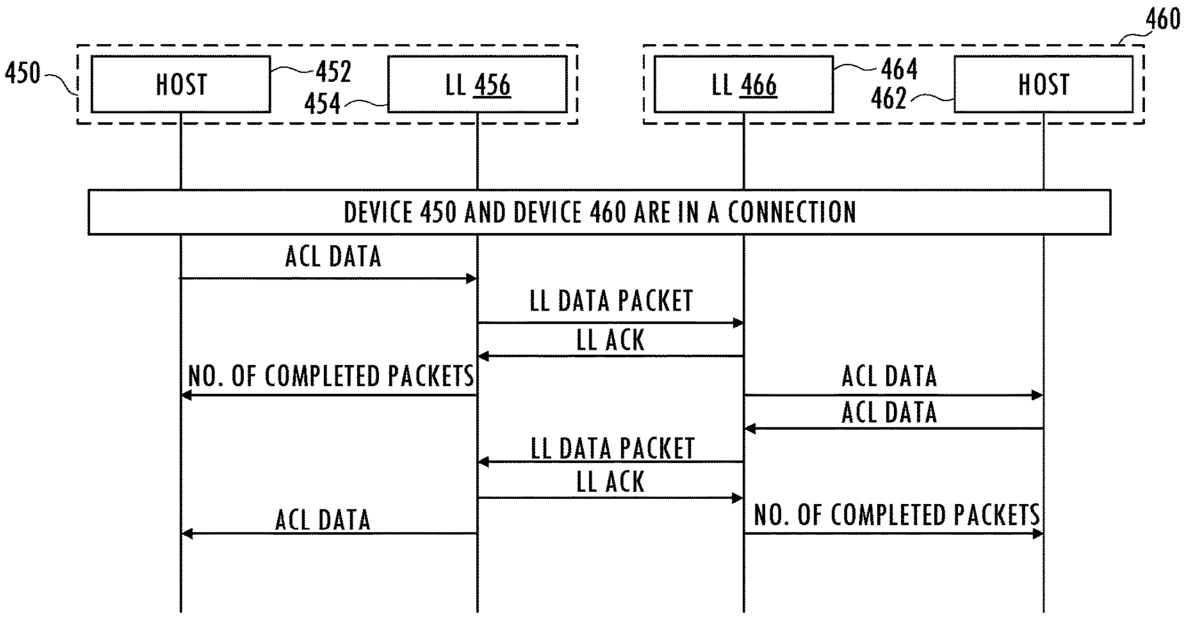
FIG. 4B illustrates an exemplary timing diagram for sending data between two devices in a connection in a conventional BLE communications system.

Referring to FIGS. 4A and 4B, in at least one embodiment, wireless communications device 450 includes host 452 and controller 454 implementing link layer 456 and wireless communications device 460 includes host 462 and controller 464 implementing link layer 466. In an exemplary protocol, host 452 configures link layer 456 in an initiating state (e.g., by sending an LE CREATE CONNECTION PDU), and host 462 configures link layer 466 in an advertising state. Link layer 456 listens for advertising PDUs. In an advertising state, link layer 466 transmits an ADVERTISEMENT PDU. In response to receiving an advertising PDU, wireless communications device 450 initiates a connection to wireless communications device 460 (e.g., sending a CONNECT_IND PDU). A successful initiation results in link layer 456 sending an LE CONNECTION COMPLETE PDU to host 452 and link layer 466 sending the LE CONNECTION COMPLETE PDU to host 460, and wireless communications device 450 and wireless communications device 460 communicate DATA PHYS CHANNEL PDUs. When wireless communications device 450 and wireless communications device 460 are in a connection, either wireless communications device can transmit data. An exemplary protocol communicates ACL data using a read request (e.g., ACL DATA and LL DATA PACKET) and return of a read response that indicates the number of data packets completed (e.g., LL ACK and NO. OF COMPLETED PACKETS).

Figure 5:
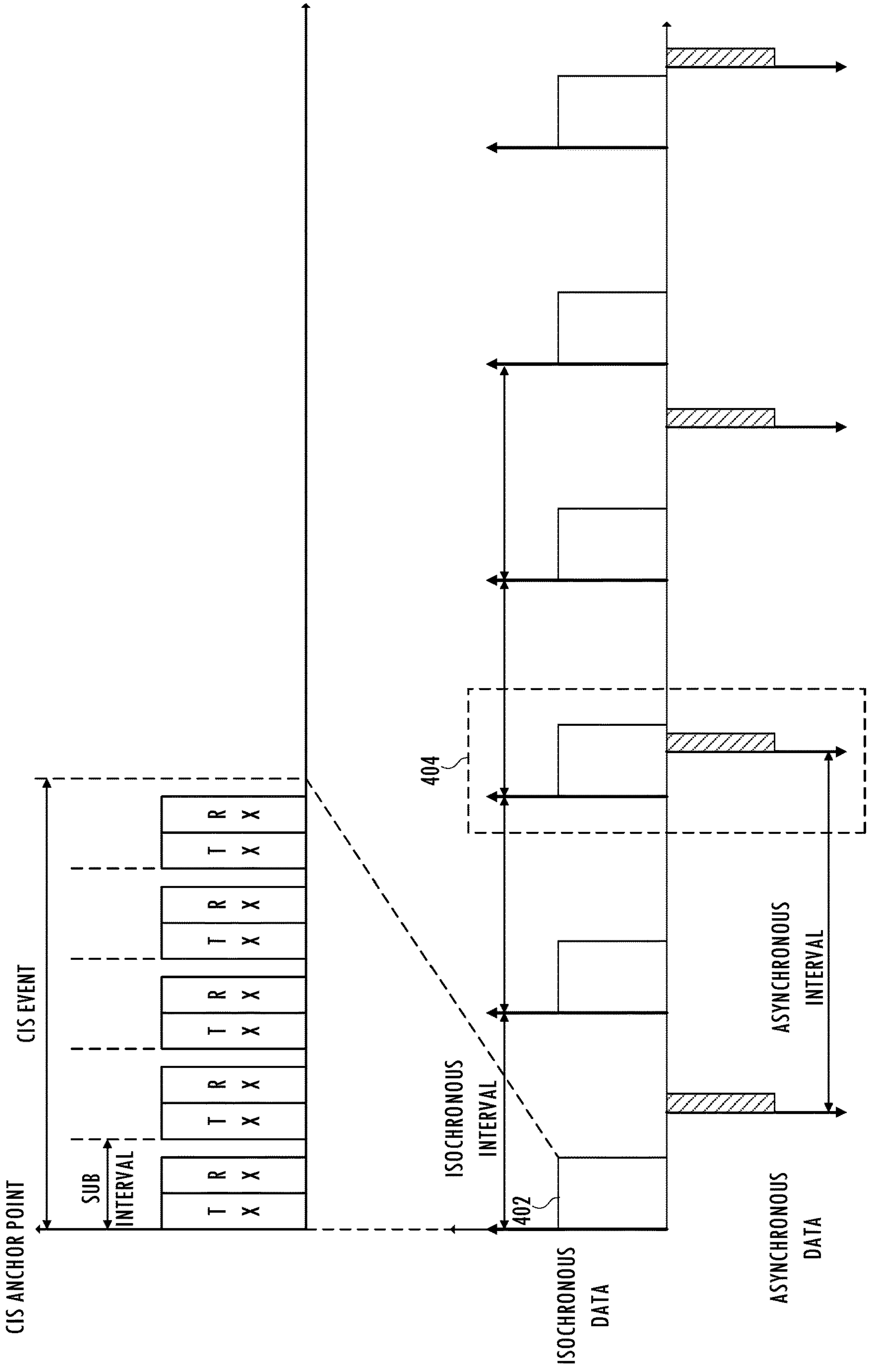
FIG. 5 illustrates exemplary timing diagrams for communication of multiple data streams in a conventional BLE communications system.

Referring to FIGS. 4A, 4B, and 5, wireless communications device 450 establishes a bi-directional, point-to-point communication with wireless communications device 460 using asynchronous data transport for a first data stream and a bi-directional, point-to-point communication with the other wireless communications device using isochronous data transport for a second data stream over a physical channel in a BLE communications system. Wireless communications device 450 establishes the connection with wireless communications device 460 in response to receiving an advertising packet and responding to that advertising packet with a protocol data unit requesting a connection, as described above. The request typically specifies various parameters including access address, connection interval, peripheral latency, and supervision timeout, etc. Wireless communications device 450 transitions from a standby state to an initiating state and then enters a connection state and assumes the role of the central device. Wireless communications device 460 transitions from the advertising state to the connection state and assumes the role of the peripheral device. The connection interval parameter defines how often the transmitter and receiver can be used for servicing the connection. When the connection interval expires, a connection event begins. For example, during a connection event, the central device and the peripheral device alternate sending and receiving packets. The peripheral device sends a packet in response to receiving a packet unless the peripheral device receives multiple consecutive invalid checksum (e.g., cyclic redundancy check (CRC)) matches.

For an isochronous data channel, an isochronous event (e.g., a CIS event) is divided into one or more subevents spaced apart by a predetermined duration. The central device transmits once and the peripheral device responds. For a CIS, the central device stores CIS parameters including an identifier, isochronous interval (i.e., time between the CIS anchor points of adjacent CIS events), sub interval (i.e., the time between the start of two consecutive subevents of a CIS), a maximum length of a subevent, a maximum number of data octets carried in each CIS data PDU, time taken by a central or peripheral to transmit a CIS PDU having a maximum payload, and a maximum number of subevents in each CIS. The central or peripheral device closes an isochronous event at the end of its last subevent and may close the isochronous event early by using a Close Isochronous Event (CIS) bit. Connection interval 402 may include multiple sub intervals and a device (a peripheral or a central device) can transmit and receive (e.g., receive an acknowledgement or other data) in each subinterval. The connection intervals of the isochronous data channel and the asynchronous data channel are independent of each other. If a scheduler (e.g., a scheduler in a baseband resource manager of controller 454) detects a conflict, e.g., the scheduler detects an overlap in time of connection events, as in interval 404, the scheduler prioritizes the isochronous connection event and delays asynchronous data packets corresponding to the asynchronous connection event until the next connection event. This can result in frequent delays for asynchronous data.

An isochronous channel extension technique transmits regular asynchronous data, e.g., data physical channel PDUs, using the isochronous link to reduce the latency of asynchronous data transfers in the event of a connection interval conflict with the same peer device. The isochronous channel extension technique reduces scheduling conflicts between isochronous data transactions and asynchronous data transactions with the same peer thereby reducing scheduler complexity and reducing the latency for asynchronous data transfer in the presence of an isochronous link. Although conventional isochronous data transmissions end an isochronous event early when all of the scheduled isochronous payloads in both directions have been transmitted and acknowledged, embodiments of the isochronous channel extension technique forgo closing an isochronous event early and instead use the remainder of the isochronous event for asynchronous payloads.

Figure 6:
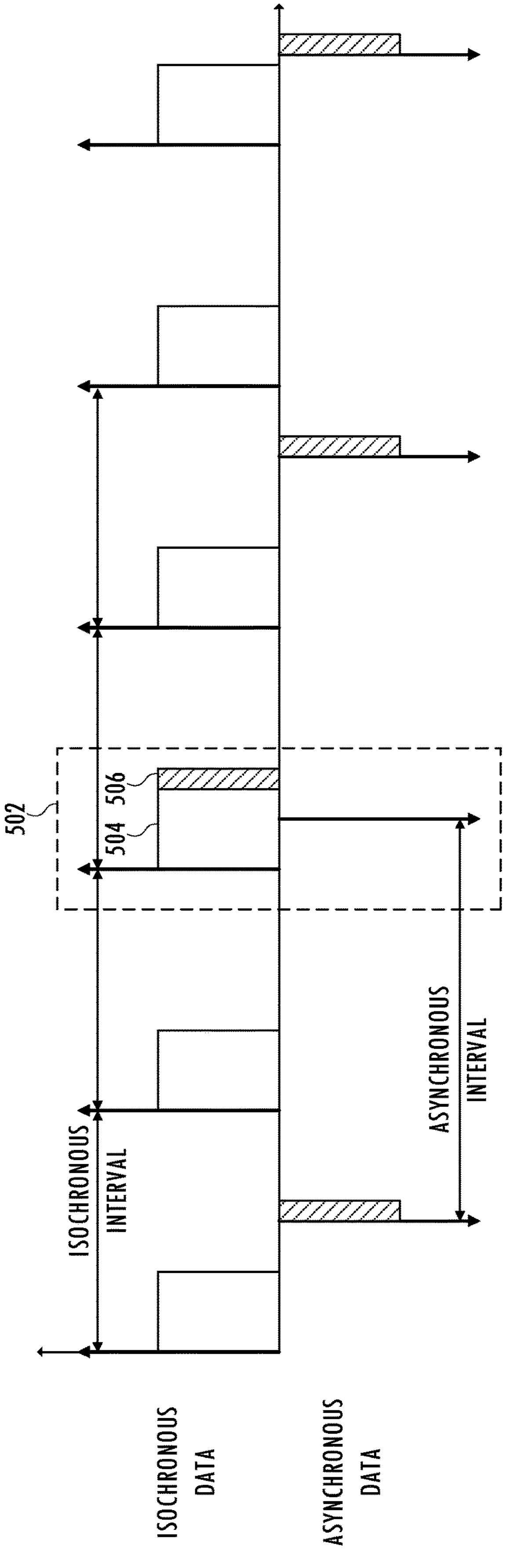
FIG. 6 illustrates exemplary timing diagrams for communication of multiple data streams in a wireless communications system consistent with at least one embodiment of the invention.

Referring to FIG. 6, the isochronous channel extension technique uses the end of listening for more packets by a peripheral or central device in response to an explicit indication to close an isochronous event or in response to reaching a maximum number of subevents in the isochronous event. Typically, the isochronous events do not reach the maximum number of subevents before successful exchange of scheduled payloads. Instead, the isochronous event closes in response to an explicit indication from both the central device and the peripheral device. The isochronous channel extension technique does not close the isochronous event after exchange of scheduled payloads. Instead, the isochronous channel extension technique immediately exchanges asynchronous payloads starting with the next subevent (if available) in an isochronous event. For example, the isochronous event in interval 502 exchanges the asynchronous payload (e.g., data physical channel PDUs), which would otherwise have been delayed, within the isochronous event, in subevent 506 after transmission of the scheduled isochronous payload in subevent 504.

In an embodiment, the isochronous channel extension technique is implemented using subprocedures executing on each central device and peripheral device: a procedure to inform a peer of the capability to exchange asynchronous payloads as a part of an isochronous connection event and a procedure to exchange asynchronous data packets as part of an isochronous connection event. For example, a procedure to inform capability to exchange asynchronous payloads as a part of an isochronous event can announce the capability as part of a routine for establishing a connection, as part of a vendor-specific link layer, or as part of custom profiles on top of a Generic Attribute (GATT) profile.

Figure 7A:
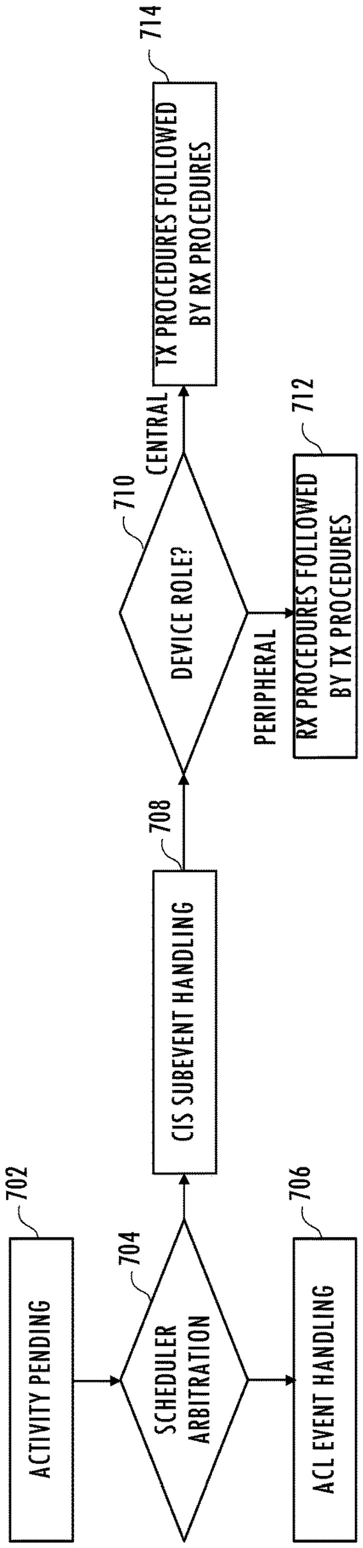
FIG. 7A illustrates an exemplary information and control flow for a subprocedure of the extension of an isochronous data channel technique consistent with at least one embodiment of the invention.

Referring to FIG. 7A, in an embodiment, a controller of a wireless communications device detects an activity pending (702) and a scheduler implemented by the controller performs arbitration (704). If an asynchronous connection event (e.g., an ACL event) is pending and an isochronous connection event (e.g., a CIS subevent) is not pending, then the controller handles the event consistent with conventional ACL handling (706). If an isochronous connection event (e.g., a CIS subevent) is pending, then the controller begins isochronous connection event (e.g., CIS subevent) handling (708). The controller determines the role of the associated wireless communications device (710). If the wireless communications device is configured as a central device, then the wireless communications device performs transmit procedures followed by receive procedures (714). If the wireless communications device is configured as a peripheral device, then the wireless communications device performs receive procedures followed by transmit procedures (712).

Figure 7B:
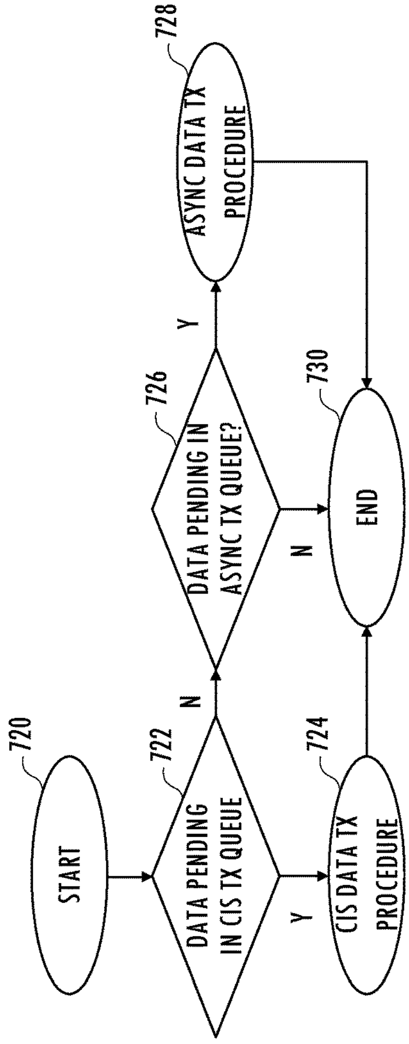
FIG. 7B illustrates an exemplary information and control flow for a transmitter procedure of the extension of an isochronous data channel technique consistent with at least one embodiment of the invention.

Referring to FIG. 7B, in an embodiment, a controller of a wireless communications device starts a transmit procedure of the isochronous channel extension technique (720) and determines whether any data is pending in an isochronous channel transmit queue (e.g., a CIS transmit queue) (722). If data is pending in the isochronous channel transmit queue, then the controller performs isochronous data transmit procedure (724) and the transmit procedure of the isochronous channel extension technique ends (730). If no data is pending in the isochronous channel transmit queue, then the controller determines whether any data is pending in an asynchronous channel transmit queue (726). If data is pending in the asynchronous channel transmit queue, then the controller performs an asynchronous data transmit procedure (728) and the transmit procedure of the isochronous channel extension technique ends (730). If data is not pending in an asynchronous queue, then the transmit procedure of the isochronous channel extension technique ends (730). If data is pending in the isochronous channel transmit queue, then the controller performs an isochronous channel data transmit procedure (728) and the transmit procedure of the isochronous channel extension technique ends (730).

Figure 7C:
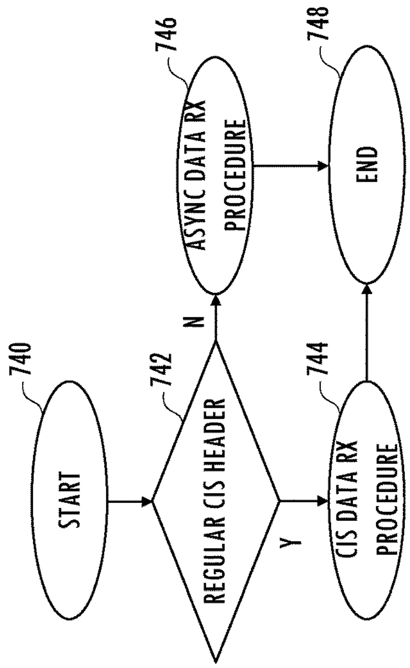
FIG. 7C illustrates an exemplary information and control flow for a receiver procedure of the extension of an isochronous data channel technique consistent with at least one embodiment of the invention.

Referring to FIG. 7C, in an embodiment, a controller of a wireless communications device starts a receive procedure of the isochronous channel extension technique (740) and determines whether the header of a received packet is a regular isochronous data packet (e.g., CIS packet) header (742). If the header is a regular isochronous data packet header, then the controller performs isochronous data receive procedure (744) and the receive procedure of the isochronous channel extension technique ends (748). If the header is not a regular isochronous data packet header, then the controller performs an asynchronous data receive procedure (746) and the receive procedure of the isochronous channel extension technique ends (748).

Figure 8A:
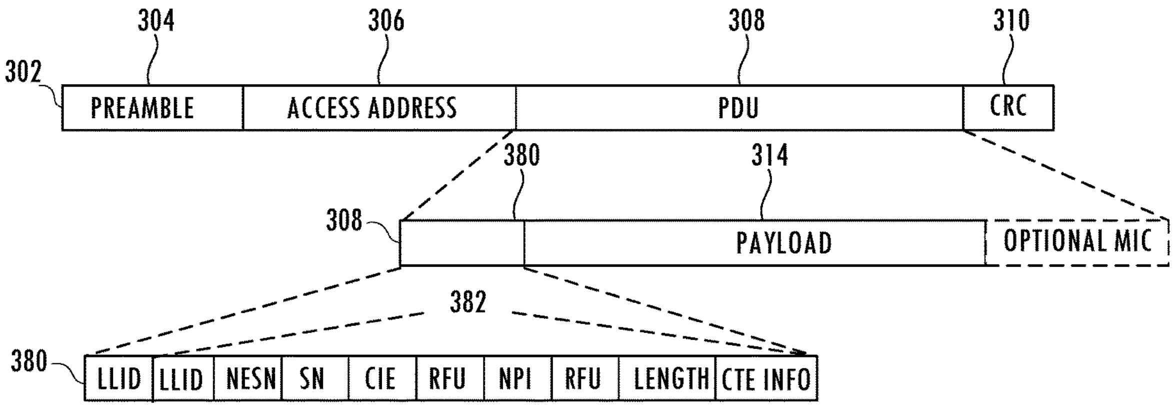
FIG. 8A illustrates a format of an extended CIS packet consistent with at least one embodiment of the invention.

In an embodiment, a procedure to exchange asynchronous data packets as part of isochronous connection events may encapsulate asynchronous data packets or recover asynchronous data packets using an isochronous packet header having one or more bits configured to indicate that the packet should be parsed as an asynchronous data packet. Asynchronous data packet length does not exceed the SDU size negotiated for each direction. The bit(s) indicate whether an isochronous payload corresponds to an asynchronous link and needs to be processed by the link layer instead of the isochronous adaptation layer. For example, referring to FIGS. 7B, 7C, and 8A, asynchronous data transmit procedure 728 encodes an initial two bits of the header of an isochronous PDU, i.e., encodes the Link Layer ID bits to have state 0b11, indicating the presence of a data physical channel PDU encapsulated within an isochronous data packet. Header 380 includes typical data physical channel PDU header 382 immediately following a field of Link Layer ID bits. Asynchronous data receiver procedure 746 decodes the packet accordingly to recover the encapsulated data physical channel PDU.

Figure 8B:
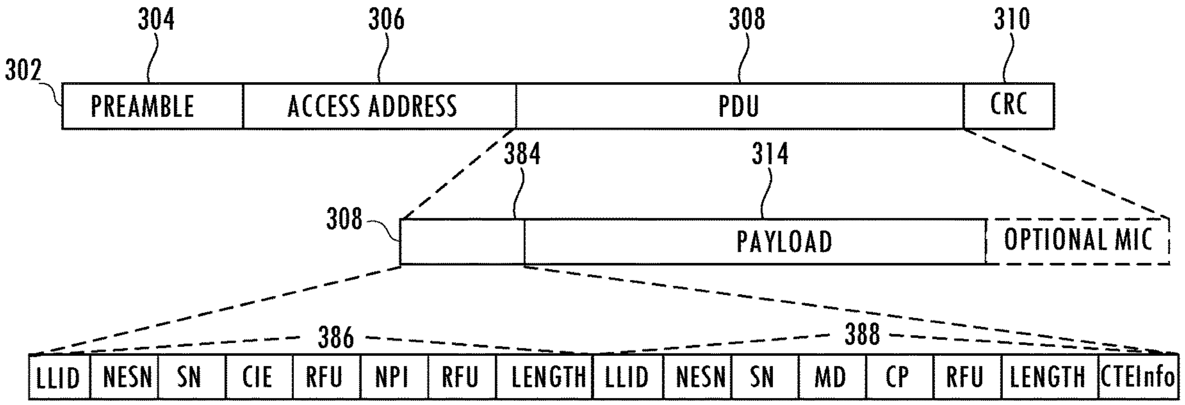
FIG. 8B illustrates an alternative format of an extended CIS packet consistent with at least one embodiment of the invention.

Referring to FIGS. 7B, 7C, and 8B, in another embodiment, asynchronous data transmit procedure 728 encodes an initial two bits of header 386 of an isochronous PDU, i.e., encodes the Link Layer ID bits to have state 0b11 or sets one of the bits reserved for future use to 0b1, indicating the presence of a data physical channel PDU encapsulated within an isochronous data packet. Header 384 includes typical data physical channel PDU header 388 following isochronous data packet header 386. Asynchronous data receiver procedure 746 decodes the packet accordingly to recover the encapsulated data physical channel PDU.

The isochronous channel extension technique may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative and is not intended to limit the scope of the invention as set forth in the following claims. For example, while the invention has been described in an embodiment in a BLE system, one of skill in the art will appreciate that the teachings herein can be utilized with other communications protocols supporting communications using an isochronous data channel and another data channel. The terms “first,” “second,” “third,” and so forth, as used in the claims, unless otherwise clear by context, distinguish between different items in the claims and do not otherwise indicate or imply any order in time, location or quality. For example, “a first received signal,” and “a second received signal,” do not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for communicating between devices using a wireless communications interface, the method comprising:

transmitting by a first device, a first data stream using a first channel and a second data stream using a second channel, the first channel having a first interval of first connection events and the second channel having a second interval of second connection events, the first connection events including a first conflicting connection event conflicting with a second conflicting connection event of the second connection events, wherein a first packet of the first data stream associated with the first conflicting connection event is transmitted in the first conflicting connection event and a second packet of the second channel associated with the second conflicting connection event is transmitted in the first conflicting connection event; and encoding, in a header of a third packet of the first conflicting connection event, an indication of encapsulation of the second packet in the third packet of the first conflicting connection event, wherein the second packet is encapsulated in the third packet of the first conflicting connection event.

2. The method as recited in claim 1 wherein the second packet is transmitted in the first conflicting connection event of the first channel in response to an indication to close the first conflicting connection event.

3. The method as recited in claim 1 further comprising:

communicating between the first device and a second device, capability information for communicating packets associated with the second channel using the first channel.

4. The method as recited in claim 3 wherein the capability information is communicated during a connection establishment sequence, during a link layer procedure, or using a custom attribute profile.

5. The method as recited in claim 1, wherein the wireless communications interface is a Bluetooth Low Energy interface, the first device is configured as a central device, a second device is configured as a peripheral device, the first channel corresponds to isochronous data, and the second channel corresponds to asynchronous data, and wherein the first channel is associated with real-time data.

6. A wireless communications system comprising:

a first device configured to transmit a first data stream using a first channel and a second data stream using a second channel, the first channel having a first interval of first connection events and the second channel having a second interval of second connection events, the first connection events including a first conflicting connection event conflicting with a second conflicting connection event of the second connection events, wherein a first packet of the first data stream associated with the first conflicting connection event is transmitted in the first conflicting connection event and a second packet of the second channel associated with the second conflicting connection event is transmitted in the first conflicting connection event, wherein the second packet is encapsulated in a third packet of the first conflicting connection event, and wherein an indication of encapsulation of the second packet in the third packet of the first conflicting connection event is encoded in a header of the third packet of the first conflicting connection event.

7. The wireless communications system as recited in claim 6, wherein the first device transmits the second packet in the first conflicting connection event of the first channel in response to an indication to close the first conflicting connection event.

8. The wireless communications system as recited in claim 6, wherein the first device further comprises:

a storage element; and a processor configured to execute instructions stored in the storage element, the instructions being executable by the processor to cause the processor to provide the first packet of the first channel and the second packet of the second channel for transmission.

9. The wireless communications system as recited in claim 6 further comprising:

a second device configured to receive the first data stream using the first channel and the second data stream using the second channel, wherein the first device and the second device are configured to exchange capability information for communicating packets associated with the second data stream using the first channel.

10. A method for communicating between devices using a wireless communications interface, the method comprising:

receiving by a first device, a first data stream using a first channel and a second data stream using a second channel, the first channel having a first interval of first connection events and the second channel having a second interval of second connection events, wherein a first packet of the first data stream associated with a first conflicting connection event is received in the first conflicting connection event and a second packet of the second channel associated with a second conflicting connection event is received in the first conflicting connection event; and detecting the second packet within a third packet of the first conflicting connection event by decoding a header of the third packet of the first conflicting connection event, wherein the second packet is encapsulated in the third packet of the first conflicting connection event.

11. The method as recited in claim 10 wherein the first channel is associated with real-time data.

12. The method as recited in claim 10 further comprising:

communicating between the first device and a second device a capability for communicating packets associated with the second data stream using the first channel.

13. The method as recited in claim 10 further comprising:

detecting the second packet as being associated with the second conflicting connection event and received in a sub-event of the first conflicting connection event in response to decoding a header of the second packet.

14. The method as recited in claim 10 further comprising:

detecting the second packet as being received in the first conflicting connection event of the first channel in response to an indication to close the first conflicting connection event.

* * * * *